(12) United States Patent
Adkins et al.

(10) Patent No.: US 11,235,278 B2
(45) Date of Patent: Feb. 1, 2022

(54) SYSTEMS AND METHODS FOR CO2 SEQUESTRATION IN MARINE VESSELS

(71) Applicants: California Institute of Technology, Pasadena, CA (US); University of Southern California, Los Angeles, CA (US)

(72) Inventors: Jess Firey Adkins, Altadena, CA (US); William Max Berelson, Los Angeles, CA (US); David B. Rogers, Pasadena, CA (US)

(73) Assignees: California Institute of Technology, Pasadena, CA (US); University of Southern California, Los Angeles, CA (US)

( * ) Notice: Subject to any disclaimer, the term of this patent is extended or adjusted under 35 U.S.C. 154(b) by 0 days.

(21) Appl. No.: 16/883,637

(22) Filed: May 26, 2020

(65) Prior Publication Data

US 2020/0368677 A1 Nov. 26, 2020

Related U.S. Application Data

(60) Provisional application No. 62/852,236, filed on May 23, 2019.

(51) Int. Cl.
*B01D 53/14* (2006.01)
*B01D 53/34* (2006.01)
*B01D 53/92* (2006.01)

(52) U.S. Cl.
CPC ..... *B01D 53/1475* (2013.01); *B01D 53/1412* (2013.01); *B01D 53/1481* (2013.01);
(Continued)

(58) Field of Classification Search
CPC ............ F01N 2590/02; F01N 2570/10; F01N 2570/04; F01N 3/0807; B01D 2252/1035;
(Continued)

(56) References Cited

U.S. PATENT DOCUMENTS 2,545,194 A * 3/1951 Colburn .................... F24F 3/16
95/139
7,655,193 B1 2/2010 Rau et al.
(Continued)

FOREIGN PATENT DOCUMENTS

CN 101810985 A 8/2010
CN 101918110 A 12/2010
(Continued)

OTHER PUBLICATIONS

International Search Report and Written Opinion for International Application No. PCT/US2020/034300, Search completed Sep. 11, 2020, dated Sep. 11, 2020, 9 Pgs.
(Continued)

*Primary Examiner* — Timothy C Vanoy
(74) *Attorney, Agent, or Firm* — KPPB LLP (57) ABSTRACT

Systems and methods for sequestering emissions from marine vessels are provided. Emissions (either flue gas from exhaust or $CO_2$ carried on the ship under pressure in gas cylinders or $CO_2$ obtained during the ships travel via capture) are mixed in a reactor with sea water (e.g., via gas exchange through head-space equilibration or bubbling through a diffuser) until a pH of 5.5 to 6.5 is obtained. Systems and reactors pump seawater through a reactor vessel containing a reaction medium (e.g., carbonates and silicates). The reactor produces an effluent that can be expelled into the ocean. The effluent produced from the result of a reaction according to embodiments has approximately twice the concentration of Dissolved Inorganic Car-
(Continued)

bon (DIC) and Alkalinity (Alk) as the incoming sea water and has an increased $Ca^{+2}$ concentration above sea water.

**20 Claims, 8 Drawing Sheets
(6 of 8 Drawing Sheet(s) Filed in Color)**

(52) U.S. Cl.
CPC ....... *B01D 53/1493* (2013.01); *B01D 53/346* (2013.01); *B01D 53/92* (2013.01); *B01D 2252/1035* (2013.01)

(58) Field of Classification Search
CPC ................ B01D 53/92; B01D 2258/06; B01D 2258/0283; B01D 2258/012; B01D 2257/504; B01D 2257/302; B01D 2253/10; B01D 2253/106; B01D 2221/08; B01D 53/78; B01D 53/62; B01D 53/502; B01D 53/504; B01D 53/22; B01D 53/1481; B01D 53/1475; B01D 53/1443; B01J 8/02; B01J 19/24; Y02C 20/40; Y02E 20/32; Y02T 70/50
See application file for complete search history.

(56) References Cited

U.S. PATENT DOCUMENTS

| | | | |
|---|---|---|---|
| 8,329,459 | B2 | 12/2012 | Parent et al. |
| 8,722,391 | B2 | 5/2014 | Fradette et al. |
| 8,895,280 | B2 | 11/2014 | Rambo et al. |
| 9,988,653 | B2 | 6/2018 | Subhas et al. |
| 10,113,407 | B2 * | 10/2018 | Rau ........................... C25B 1/04 |
| 2001/0022952 | A1 | 9/2001 | Rau et al. |
| 2011/0070137 | A1 | 3/2011 | Brock et al. |
| 2013/0171720 | A1 | 7/2013 | McKenna et al. |
| 2013/0315811 | A1 * | 11/2013 | Peng .................... B01D 53/504 423/243.08 |
| 2013/0319230 | A1 | 12/2013 | Patel |
| 2016/0177344 | A1 | 6/2016 | Subhas et al. |
| 2018/0371506 | A1 | 12/2018 | Subhas et al. |
| 2019/0358560 | A1 * | 11/2019 | Brosch ................. B01D 47/063 |
| 2020/0038807 | A1 * | 2/2020 | Naito ..................... B01D 53/73 |
| 2020/0370001 | A1 * | 11/2020 | Constantz ............... C04B 28/04 |

FOREIGN PATENT DOCUMENTS

| | | |
|---|---|---|
| CN | 102105569 A | 6/2011 |
| CN | 102343199 A | 2/2012 |
| CN | 102612549 A | 7/2012 |
| CN | 106076066 A | 11/2016 |
| CN | 108377650 A | 8/2018 |
| CN | 110079435 A | 8/2019 |
| GB | 2589037 B | 7/2021 |
| WO | 2008115662 A2 | 9/2008 |
| WO | 2014000113 A1 | 1/2014 |
| WO | 2016100937 A1 | 6/2016 |

OTHER PUBLICATIONS

Peterson, "Calcite: Rates of Dissolution in a Vertical Profile in the Central Pacific", Science, Dec. 23, 1996, vol. 154, No. 3756, pp. 1542-1544.
Plummer et al., "The dissolution of calcite in CO2-saturated solutions at 25 degrees C and 1 atmosphere total pressure", Geochimical et Cosmochimica Acta, 1976, vol. 40, pp. 191-202.
Rau, "CO2 Mitigation via Capture and Chemical Conversion in Seawater", Environmental Science & Technology, Dec. 28, 2010, vol. 45, No. 3, pp. 1088-1092.
Sabine et al., "The Oceanic Sink for Anthropogenic CO2", Science, Jul. 16, 2004, vol. 305, pp. 367-371.
Schwartz et al., "Growth of Vaterite and Calcite Crystals in Gels", Materials Research Bulletin, Oct. 5, 1971, vol. 6, pp. 1341-1344.
Shiraki et al., "Dissolution Kinetics of Calcite in 0.1 M NaCl Solution at Room Temperature: An Atomic Force Microscopic (AFM) Study", Aquatic Geochemistry, 2000, vol. 6, pp. 87-108.
Sigman et al., "Glacial/interglacial variations in atmospheric carbon dioxide", Nature, Oct. 19, 2000, vol. 407, pp. 859-869.
Silverman et al., "Effect of aragonite saturation, temperature and nutrients on the community calcification rate of a coral reef", Journal of Geophysical Research, May 1, 2007, vol. 112, C05004, 14 pgs.
Sjoberg, "A fundamental equation for calcite dissolution kinetics", Geochimica et Cosmochimica Acta, 1976, vol. 40, pp. 441-447.
Sjoberg et al., "The Effect of Added Dissolved Calcium on Calcite Dissolution Kinetics in Aqueous Solutions at 25 degrees C", Chemical Geology, 1985, vol. 49, pp. 405-413.
Subhas et al., "A novel determination of calcite dissolution kinetics in seawater", Geochimica et Cosmochimica Acta, vol. 170, No. 1, Aug. 31, 2015, pp. 51-68.
Wang et al., "Comprehensive Study of the Hydration and Dehydration Reactions of Carbon Dioxide in Aqueous Solution", The Journal of Physical Chemistry A, 2010, vol. 114, pp. 1734-1740.
International Preliminary Report on Patentability for International Application PCT/US2015/066920, Report dated Jun. 20, 2017, dated Jun. 29, 2017, 8 Pgs.
International Search Report and Written Opinion for International Application No. PCT/US2015/066920, Search completed Apr. 8, 2016, dated Apr. 8, 2016, 10 Pgs.
Anbeek, "Surface roughness of minerals and implications for dissolution studies", Geochimica et Cosmochimica Acta, Jan. 23, 1992, vol. 56, pp. 1461-1469.
Andersson et al., "Net Loss of CaCO3 from a subtropical calcifying community due to seawater acidification: mesocosm-scale experimental evidence", Biogeosciences, Aug. 27, 2009, vol. 6, pp. 1811-1823.
Andersson et al., "Ocean Acidification and Coral Reefs: Effects on Breakdown, Dissolution, and Net Ecosystem Calcification", Annual Review of Marine Science, 2013, vol. 5, pp. 321-348.
Arakaki et al., "A Continuous and Mechanistic Representation of Calcite Reaction-Controlled Kinetics in Dilute Solutions at 25 Degrees C and 1 Atm Total Pressure", Aquatic Geochemistry, Jan. 20, 1995, vol. 1, pp. 105-130.
Archer et al., "Dynamics of fossil fuel CO2 neutralization by marine CaCO3", Global Biogeochemical Cycles, Jun. 1998, vol. 12, No. 2, pp. 259-276.
Bednarsek et al., "Limacina helicina shell dissolution as an indicator of declining habitat suitability owning to ocean acidification in the California Current Ecosystem", Proceedings of the Royal Society B: Biological Sciences, Apr. 2, 2014, vol. 281, Jan. 23, 2014, 8 pgs.
Berelson et al., "Relating estimates of CaCO3 production, export, and dissolution in the water column to measurements of CaCO3 rain into sediment traps and dissolution of the sea floor: A revised global carbonate budget", Global Biogeochemical Cycles, Mar. 24, 2007, vol. 21, GB1024, 15 pgs.
Berger, "Foraminiferal Ooze: Solution at Depths", Science, Apr. 21, 1967, vol. 156, pp. 383-385.
Berner et al., "Dissolution Kinetics of Calcium Carbonate in Sea Water", American Journal of Science, Feb. 1974, vol. 274, pp. 108-134.
Boudreau, "Carbonate dissolution rates at the deep ocean floor", Geophysical Research Letters, Feb. 27, 2013, vol. 40, pp. 744-748.
Boudreau et al., "Ongoing transients in carbonate compensation", Global Biogeochemical Cycles, Nov. 4, 2010, vol. 24, GB4010, 13 pgs.
Brunauer et al., "Adsorption of Gases in Multimolecular Layers", Journal of the American Chemical Society, Feb. 1938, vol. 60, pp. 309-319.
Coto et al., "Effects in the solubility of CaCO3: Experimental study and model description", Fluid Phase Equilibria, vol. 324, Mar. 23, 2012, pp. 1-7.
Cubillas et al., "Experimental determination of the dissolution rates of calcite, aragonite, and bivalves", Chemical Geology, 2005, vol. 216, pp. 59-77.

(56) References Cited

OTHER PUBLICATIONS

De Kanel et al., "A simple technique for surface area determination", Journal of Physics E: Scientific Instruments, 1979, vol. 12, pp. 272-273.
Dickson et al., "A comparison of the equilibrium constants for the dissociation of carbonic acid in seawater media", Deep-Sea Research, Apr. 8, 1987, vol. 34, No. 10, pp. 1733-1743.
Dickson et al., "Guide to best practices for ocean CO2 measurements", Pices Special Publication 3, Oct. 12, 2007, 175 pgs.
Emerson et al., "Carbon fluxes at the sediment-water interface of the deep-sea: calcium carbonate preservation", Journal of Marine Research, 1981, pp. 139-162.
Feely et al., "Decadal changes in the aragonite and calcite saturation state of the Pacific Ocean", Global Biogeochemical Cycles, Jul. 4, 2012, vol. 26, GB3001, 15 pgs.
Finneran et al., "Calcite dissolution kinetics in saline waters", Chemical Geology, Aug. 7, 2009, vol. 268, pp. 137-146.
Fischer et al., "How predictable are dissolution rates of crystalline material?", Geochimica et Cosmochimica Acta, Sep. 19, 2012. vol. 98, pp. 177-185.
Fukuhara et al., "An in situ experiment of calcium carbonate dissolution in the central Pacific Ocean", International Journal of Greenhouse Gas Control, 2008, vol. 2, pp. 78-88.
Gehlen et al., "Reassessing the dissolution of marine carbonates: I. Solubility", Deep-Sea Research I, Mar. 9, 2005, vol. 52, pp. 1445-1460.
Gehlen et al., "Reassessing the dissolution of marine carbonates: II. Reaction kinetics", Deep-Sea Research I, Mar. 9, 2005, vol. 52, pp. 1461-1476.
Gledhill et al., "Calcite dissolution kinetics in Na—Ca—Mg—Cl brines", Geochimical et Cosmochimica Acta, Mar. 29, 2006, vol. 70, pp. 5802-5813.
Hales et al., "Evidence in support of first-order dissolution kinetics of calcite in seawater", Earth and Planetary Science Letters, Jan. 21, 1997, vol. 148, pp. 317-327.
Honjo et al., "Dissolution Rates of Calcium Carbonate in the Deep Ocean; An In-Situ Experiment in the North Atlantic Ocean", Earth and Planetary Science Letters, Mar. 9, 1978, vol. 40, pp. 287-300.
Ilyina et al., "Detection and projection of carbonate dissolution in water column and deep-sea sediments due to ocean acidification", Geophysical Research Letters, Mar. 30, 2012, vol. 39, L06606, 6 pgs.
Keir, "The dissolution kinetics of biogenic calcium carbonates in seawater", Geochimica et Cosmochimica Acta, 1980, vol. 44, pp. 241-252.
Leclercq et al., "CO2 partial pressure controls the calcification rate of a coral community", Global Change Biology, 2000, vol. 6, pp. 329-334.
MacInnis et al., "The role of dislocations and surface morphology in calcite dissolution", Geochimica et Cosmochimica Acta, 1992, vol. 56, pp. 1113-1126.
Mehrbach et al., "Measurement of the Apparent Dissociation Constants of Carbonic Acid in Seawater at Atmospheric Pressure", Limnology and Oceanography, Nov. 1973, vol. 18, No. 6, pp. 897-907.
Milliman et al., "Biologically mediated dissolution of calcium carbonate above the chemical lysocline?", Deep-Sea Research I, Feb. 2, 1999, vol. 46, pp. 1653-1669.
Morse, "Dissolution Kinetics of Calcium Carbonate in Sea Water. III: A New Method for the Study of Carbonate Reaction Kinetics", American Journal of Science, Feb. 1974, vol. 274, pp. 97-107.
Morse et al., "The dissolution kinetics of major sedimentary carbonate materials", Earth-Science Reviews, 2002, vol. 58, pp. 51-84.
Mucci, "The Solubility of Calcite and Aragonite in Seawater at Various Salinities, Temperatures, and One Atmosphere Total Pressure", American Journal of Science, Sep. 1983, vol. 283, pp. 780-799.
Nickl et al., "Growth of Calcite Crystals in Gels", Journal of Electrochemical Society, 1969, vol. 116, No. 9, pp. 1258-1260.

\* cited by examiner

SYSTEMS AND METHODS FOR CO2 SEQUESTRATION IN MARINE VESSELS

CROSS REFERENCE TO RELATED APPLICATIONS

This application claims priority to U.S. Provisional Application Ser. No. 62/852,236, entitled "Systems and Methods for CO2 Sequestration in Marine Vessels" to Adkins et al., filed May 23, 2019, which is incorporated herein by reference in its entirety.

STATEMENT REGARDING FEDERALLY SPONSORED RESEARCH OR DEVELOPMENT

This invention was made with government support under OCE 1834475 awarded by the National Science Foundation. The government has certain rights in the invention.

FIELD OF THE INVENTION

The present invention generally relates to systems and methods for sequestering emissions from marine vessels.

BACKGROUND

Carbon dioxide ($CO_2$) constitutes about 0.04% (400 parts per million) of the atmosphere. Despite its relatively small overall concentration, $CO_2$ is a potent greenhouse gas that plays an important role in regulating the Earth's surface temperature. Presently, anthropogenic $CO_2$ generation is taking place at a rate greater than it is being consumed and/or stored, leading to increasing concentrations of $CO_2$ in the atmosphere. There is a growing concern that rising levels of $CO_2$ in the earth's atmosphere may present a substantial environmental challenge. As a result, there is an increased interest in developing methods for removing $CO_2$ from emission streams and the atmosphere and storing it in a manner that prevents its future release into the atmosphere. This capture and storage is collectively known as $CO_2$ sequestration.

SUMMARY OF THE INVENTION

Many embodiments of the present invention are directed to systems and methods for sequestering emissions from marine vessels.

In one embodiment, an emissions sequestration reactor for a marine vessel includes a reaction vessel having at least a gas inlet in fluid communication with an emission output stream from a marine vessel, a seawater inlet in fluid communication with a source of seawater, and a fluid outlet, the reaction vessel further having at least a mixing region adjacent the seawater and gas inlets, and a reaction region disposed between the mixing region and the outlet, a reaction medium disposed within the reaction region and configured to sequester at least one of carbon and sulfur from the emission output, and a diffusion grating onto which the porous reaction medium is disposed, positioned between the mixing region and reaction region and configured to allow fluid to prevent the porous reaction medium from passing into the mixing region while allowing seawater to pass into the reaction region from the mixing region.

In a further embodiment, the seawater inlet is connected to a structural access point on the hull of the marine vessel.

In another embodiment, the fluid outlet directs water to a location near a propeller of the marine vessel.

In a still further embodiment, an emissions sequestration reactor further includes an inflow pump in fluid communication with the seawater inlet for pumping seawater into the reaction vessel at a desired flow rate.

In still another embodiment, an emissions sequestration reactor further includes an outflow pump in fluid communication with the seawater outlet for pumping seawater out of the reaction vessel at a desired flow rate.

In a yet further embodiment, an emissions sequestration reactor further includes a sensor to monitor a reaction parameter within the emissions sequestration reactor.

In yet another embodiment, the sensor measures a parameter selected from the group consisting of temperature, pH, pressure, $pCO_2$, alkalinity, ion concentration, turbidity, optical depth, spectral data, and flow rate.

In a further embodiment again, the sensor is in communication with a controller that is configured to control reaction kinetics.

In another embodiment again, the controller controls reaction kinetics via at least one of the group consisting of: introducing additional reaction media, increasing water inflow, increasing water outflow, decreasing water inflow, decreasing water outflow, release pressure, increase pressure, increase temperature, and decrease temperature.

In a further additional embodiment, an emissions sequestration reactor further includes a reaction medium inlet connected to the reaction vessel to provide additional reaction media to the reaction region.

In another additional embodiment, an emissions sequestration reactor further includes a gravity feed system or conveyor system to provide the reaction medium to the reactor vessel.

In a still yet further embodiment, the reactor vessel is a closed system.

In still yet another embodiment, the reactor vessel comprises an excess pressure vent to maintain reaction vessel pressure.

In a still further embodiment again, the reaction medium is selected from at least one of the group consisting of carbonate and silicate.

In still another embodiment again, an emissions sequestration reactor further includes a system to control the flow of exhaust gas into the reaction vessel.

In a still yet further embodiment, an emissions sequestration reactor further includes a system to utilize waste heat to control temperature of the reactor vessel.

In a still further additional embodiment, an emissions sequestration reactor further includes a system to utilize heat of the exhaust gas to control temperature of the reactor vessel.

In still another additional embodiment, the reaction medium includes grains of approximately 500-700 µm in diameter.

In a yet further embodiment again, the reaction medium includes grains of approximately 70-100 µm in diameter.

In a further embodiment again, a reaction rate within the reactor vessel is enhanced based on grain size of the reaction medium.

In a still further embodiment, grain size of the reaction medium is adjusted to increase interaction between gaseous and liquid phases.

In yet another embodiment again, an emissions sequestration reactor further includes a system to increase contact between a gaseous phase and a liquid phase.

In a yet further additional embodiment, an emissions sequestration for a marine vessel includes a first reaction vessel having at least a gas inlet in fluid communication with an emission output stream from a marine vessel, a seawater inlet in fluid communication with a source of seawater, a second reaction vessel having at least a fluid outlet, and a reaction medium disposed within the second reaction vessel and configured to sequester at least one of carbon and sulfur from the emission output, where the first reaction vessel and second reaction vessel are in fluid communication via a conduit.

In a further embodiment, the seawater inlet is connected to a structural access point on the hull of the marine vessel.

In another embodiment, the fluid outlet directs water to a location near a propeller of the marine vessel.

In a still further embodiment, an emissions sequestration reactor further includes an inflow pump in fluid communication with the seawater inlet for pumping seawater into the reaction vessel at a desired flow rate.

In still another embodiment, an emissions sequestration reactor further includes an outflow pump in fluid communication with the seawater outlet for pumping seawater out of the reaction vessel at a desired flow rate.

In a yet further embodiment, an emissions sequestration reactor further includes a sensor to monitor a reaction parameter within the emissions sequestration reactor.

In yet another embodiment, the sensor measures a parameter selected from the group consisting of temperature, pH, pressure, $pCO_2$, alkalinity, ion concentration, turbidity, optical depth, spectral data, and flow rate.

In a further embodiment again, the sensor is in communication with a controller that is configured to control reaction kinetics.

In another embodiment again, the controller controls reaction kinetics via at least one of the group consisting of: introducing additional reaction media, increasing water inflow, increasing water outflow, decreasing water inflow, decreasing water outflow, release pressure, increase pressure, increase temperature, and decrease temperature.

In a further additional embodiment, an emissions sequestration reactor further includes a reaction medium inlet connected to the reaction vessel to provide additional reaction media to the reaction region.

In another additional embodiment, an emissions sequestration reactor further includes a gravity feed system or conveyor system to provide the reaction medium to the reactor vessel.

In a still yet further embodiment, the reactor vessel is a closed system.

In still yet another embodiment, the reactor vessel comprises an excess pressure vent to maintain reaction vessel pressure.

In a still further embodiment again, the reaction medium is selected from at least one of the group consisting of carbonate and silicate.

In still another embodiment again, an emissions sequestration reactor further includes a system to control the flow of exhaust gas into the reaction vessel.

In a still further additional embodiment, an emissions sequestration reactor further includes a system to utilize heat of the exhaust gas to control temperature of the reactor vessel.

In still another additional embodiment, a reaction rate within the reactor vessel is enhanced based on grain size of the reaction medium.

In a yet further embodiment again, grain size of the reaction medium is adjusted to increase interaction between gaseous and liquid phases.

In yet another embodiment again, an emissions sequestration reactor further includes a system to increase contact between a gaseous phase and a liquid phase.

In yet another additional embodiment, a method of sequestering carbon from a marine vessel includes providing a reaction medium disposed within a reaction region of a reaction vessel, the reaction medium being configured to sequester a pollutant from an emissions source, wherein the pollutant comprises at least one of carbon and sulfur, mixing seawater with emissions from a marine vessel together, and flowing the mixture of seawater and emissions through the porous medium such the pollutant is sequestered from the mixture.

In a further additional embodiment again, the reaction medium is selected from at least one of the group consisting of carbonate and silicate.

In another additional embodiment again, the reaction medium includes grains of approximately 500-700 µm in diameter.

In a still yet further embodiment again, the reaction medium includes grains of approximately 70-100 µm in diameter.

In still yet another embodiment again, the seawater is obtained from a structural access point on the hull of the marine vessel in fluid communication with the reaction vessel.

In a still yet further additional embodiment, the reaction vessel comprises a fluid outlet.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features and advantages of the present apparatus and methods will be better understood by reference to the following detailed description when considered in conjunction with the accompanying data and figures, which are presented as exemplary embodiments of the disclosure and should not be construed as a complete recitation of the scope of the inventive method, wherein.

DETAILED DESCRIPTION

Turning now to the drawings, systems and methods for sequestering carbon emissions (e.g., $CO_2$) are provided. In various embodiments, carbon emissions are obtained from a source, such as ambient environmental capture (e.g., direct air capture), exhaust from a ship or other emitter, or from contained or compressed $CO_2$. In certain embodiments, emissions (either flue gas from ship's exhaust or $CO_2$ carried on the ship under pressure in gas cylinders or $CO_2$ obtained during the ships travel via capture is mixed in a reactor with sea water (e.g., via gas exchange through head-space equilibration or bubbling through a diffuser) until the sea water is acidified (e.g., possessing a pH of 5.5 to 6.5). Various embodiments of systems and reactors pump seawater through a reactor vessel containing particles of a reaction medium. Reaction media in accordance with various embodiments include one or more of carbonates (e.g., $CaCO_3$, aragonite, calcite, sodium bicarbonate, etc.) and/or silicates (e.g., $MgSiO_3$, olivine, pyroxene, mafic rocks, etc.). Many embodiments utilize $CaCO_3$ having a mean particle size of 100 μm (e.g., fine sand size). Certain embodiments possess particle sizes finer than 100 μm. In some embodiments, the reactor produces an effluent that can be expelled into the ocean. An exemplary reaction with a CaCO3 media includes $CO_2$+sea water+$CaCO_3$ where the effluent includes dissolved $Ca^{+2}$ and $HCO_3^-$ ions such that the water exiting the reactor vessel has approximately twice or greater the concentration of Dissolved Inorganic Carbon (DIC) and Alkalinity (Alk) as the incoming sea water and has an increased $Ca^{+2}$ concentration above sea water values (e.g., about at least 10% above sea water values).

Similar as described above, further embodiments also remove sulfur emissions from sources, including exhaust, environmental capture, or storage, where sulfur dioxide ($SO_2$) or other sulfur oxides ($SO_x$) is mixed with seawater and reacted with a carbonate or silicate reaction media. In such embodiments $SO_2$+sea water+$CaCO_3$ to produce $SO_4$ in the effluent.

Embodiments Implementing Reactor Systems

Figure 1A:
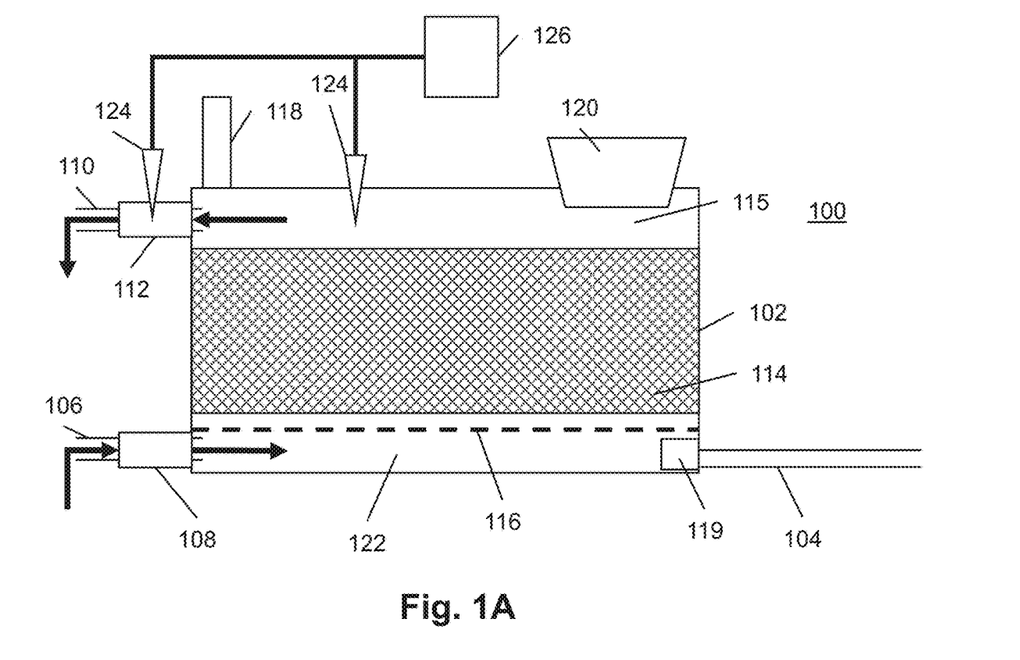
FIGS. 1A-1B provide schematic illustrations of reactor systems, in accordance with embodiments.
Figure 1B:
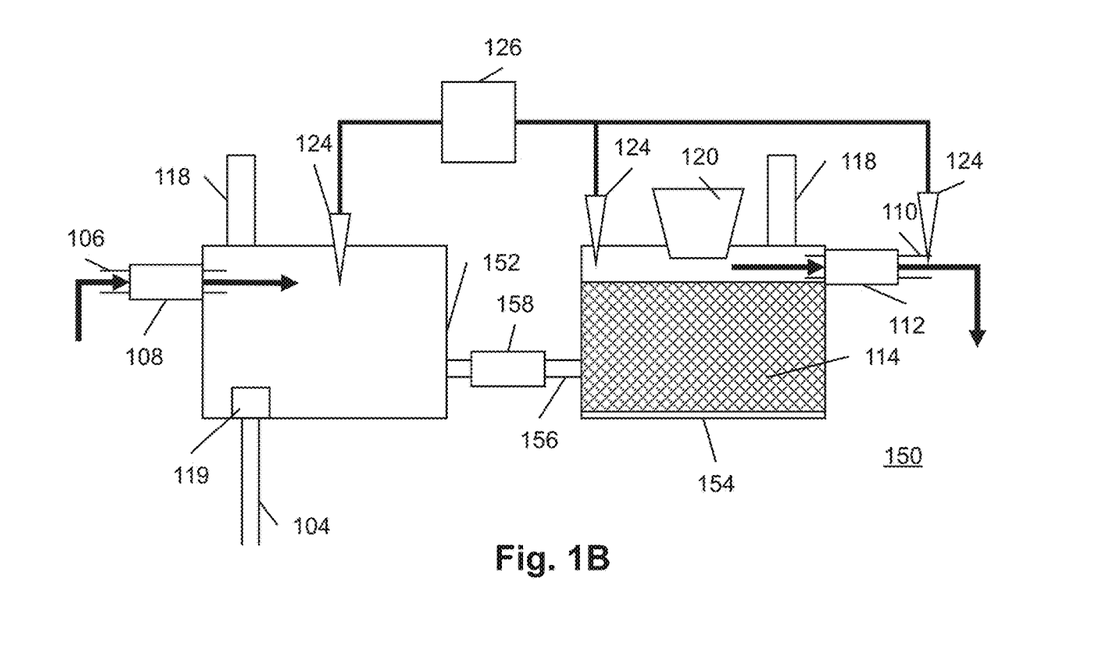

Turning to the drawings, embodiments of a system for treating emissions from marine vessels are provided. FIGS. 1A-1B illustrate emission treatment reactors in accordance with many embodiments. In particular, FIG. 1A illustrates a single stage reactor 100, while FIG. 1B illustrates a dual stage reactor 150.

In FIG. 1A, many embodiments possess a reaction vessel 102 in fluid communication with an inlet 104 for emissions (e.g., gaseous carbon, sulfur, etc.). Additional embodiments include a water inlet 106 for seawater in fluid communication with reaction vessel 102. In many embodiments, inlet 106 is connected to a structural access point, such as a hole, pore, or scupper, in the hull of a ship, such that incoming water is able to flow directly into reaction vessel 102. Some embodiments include an inflow pump 108 in fluid communication with inlet 106 to assist moving seawater into the reaction vessel 102. Further embodiments include a water outlet 110 for seawater, where some embodiments include an outflow pump 112 in fluid communication with outlet 110 to assist water exiting the reaction vessel 102. A volume of a reaction medium 114 is disposed within a reactor vessel 102 of many embodiments, where reaction medium 114 is configured to sequester carbon from the emission output. In various embodiments, reaction medium 114 includes one or more of carbonates and silicates. In various embodiments, the reaction medium 114 is separated from inlet 104 by a diffusion grate 116. While some embodiments are configured to operate under ambient pressures, additional embodiments are configured to operate at a specific pressure or pressure range. Certain embodiments include an excess pressure vent 118 to maintain reaction vessel pressure either by expelling excess fluids (e.g., gases or water) and/or to act as a relief vent in the event pressure within reaction vessel 102 exceed a suitable limit. Further, some embodiments include a reaction medium inlet 120 connected to the reaction vessel 102 to provide additional reaction media 114 in reaction region 115. Certain embodiments further include a system 119 to increase contact between a gaseous phase arising from inlet 104 and a liquid phase arising from inlet 106. In certain embodiments, system 119 to increase contact between a gaseous phase and a liquid phase is a bubbler.

During operation of embodiments of such a system, emission gases are piped into the reaction system 100 via inlet 104. In some such embodiments, a vessel exhaust is emitted through a manifold from the main engine through a stack located (typically) near the rear (stern) of a ship or vessel. In certain embodiments, inlet 104 includes valves, nozzles, connectors, special geometry (e.g., U-shape), blowers, and/or other fixtures to improve flow into reaction vessel 102 and/or to prevent backflow of any substances within reaction vessel 102 into inlet 104. Any method or system for capturing ship exhaust may be employed according to embodiments to direct exhaust through the seawater reaction system. It will be understood that reactor systems according to embodiments may be combined with other emissions systems typically incorporated with ship exhaust systems, including, for example, 'scrubbers' configured to remove particulate exhaust or criteria pollutants (e.g., NOx, SOx, PM, VOCs, etc.). Embodiments may also be employed with exhaust systems that mix exhaust gases with seawater, also referred to as 'wet exhaust' systems, which are used on many inboard motor boats. In such a process, water is heated and gases cooled. The heating that occurs to the seawater may enhance its kinetic 'power' such that dissolution occurs more rapidly than that described below with respect to baseline measurements (baseline measurements for seawater at T=21° C.). Various calculations and/or measurements have shown that the carbonate dissolution rates in sea water as a function of temperature at undersaturation levels, like those anticipated for the application, will be enhanced 3 to 4 times for a temperature increase from 5 to 37° C.

While the flue gas is directed into the system through gas inlet 104, a water inlet 106, with or without a pump 108, move seawater into the reaction vessel 102, and seawater exits reaction vessel 102 via outlet 110, with or without a second pump 112. The combination of inlet 106 and outlet 110 circulate water through the system at a desired rate (e.g., 1000 to 2000 L per second). Depending on the specific location of reactor 100, the specific configuration of inflow pump 108 and outflow pump 112 varies. For example, if reactor is located below a waterline of a ship, inlet 106 can be provided via gravity feed, such that water is pushed into reaction chamber 102 without the assistance of pump 108. However, an outflow pump 112 may be necessary to move water out of reaction vessel 102. As a corollary, if reactor 100 is above a waterline of a ship, an inflow pump 108 may be necessary to introduce water into reaction vessel 102, while outlet 110 can be processed via gravity feed. Pump strength of either an inflow pump 108 or outflow pump 112 depends on the specific location of a reactor 100, such that a greater distance from a waterline of a ship to a reactor 100 may necessitate a stronger pump.

In various embodiments, intake water is pumped into the reaction system from a sea-chest located under ship, which screens for large debris. Although one configuration is shown in the figures in which water is mixed with flue gas as it enters the bottom of reaction vessel 102, it will be understood that water may be mixed with flue gas in any configuration, such as from the top or sides of the reaction vessel. In some embodiments, seawater entering at surface ocean temperature (0-30° C.) may be heated by flue gas (as described above), or from waste heat from engines using a heat exchanger.

In many embodiments, the outflow pump 112 may be configured to remove water from the reaction vessel at same rate as it enters. In various embodiments, the removal of fine grained media (e.g., $CaCO_3$) out the exit pump may be minimized by allowing for a column of water above the sediment-water slurry to act as a sediment trap. In various embodiments, a return pump may be omitted where the configuration allows seawater to return to the ocean by spillover or gravity feed.

In various embodiments, the seawater/gas is mixed at a mixing region 122 of reaction vessel 100. This mixing portion may be separated from the main reaction vessel 102 by a diffusion grating 116. On this grating is disposed a volume of a reaction medium (e.g., ~6" layer of limestone rock, ~1.3 cm diameter). This layer of reaction medium serves as a permeable horizon for the water and gas mixture to move through before encountering the fine-sand sized limestone. On this permeable horizon a further volume of reaction medium (e.g., $CaCO_3$ (limestone) of 100 μm diameter size) is disposed such that it may react with seawater+$CO_2$ during the residence time (e.g. ~8 minute) of the water inside reactor. In embodiments, turbulence within the reaction vessel may mix the calcium carbonate thoroughly allowing permeation of the gas/seawater mixture with the reaction medium. It will be understood that in some embodiments the volume of the reaction vessel in which the gas and seawater mix may be adjusted by moving the position of the grating. In addition, although specific examples of grain sizes of reaction medium are provided, other sized grains can sit directly on top of the grating 116, as a layer of pebble-cobble sized limestone grains may be provided to help mix the water-gas mixture as it permeates through the pile of fine sand-sized limestone grains.

During the process, this fine reaction medium (e.g., limestone sand) is converted to ionic products (e.g., Ca and $HCO_3$) and thus has to be continuously replenished. Accordingly, in many embodiments access components may be provided to ensure a continuous supply of media is provided within the reaction vessel (e.g., via gravity feed, conveyor system, or other loading device). For example, in various embodiments the reaction medium may be provided via a transport mechanism comprising a slurry with surface seawater. In such configurations, water is carried by this input (e.g., water with flue gas may enter via inlet 104 and inlet 106). Such a limestone slurry may be disposed within shipping containers (e.g., within a removable bladder) such that the slurry can flow by gravity to its mixing destination. Embodiments of such bladders may be removable such that at the destination they can be folded and returned to the port of origin so as to free up containers for cargo on the return trip. In various other embodiments, special purpose shipping containers may be used to contain the slurry mixture. In some such embodiments, containers may be made collapsible so that they could be returned without displacing as many cargo containers.

However, a standard shipping container, or twenty-foot equivalent unit (TEU) may not allow for the mass to be filled with media, e.g., a TEU filled with carbonate media may exceed the loading limit of a TEU. Thus, certain embodiments use various alternative methods for holding and/or storing media. Some embodiments may use a towed bag of slurry such that no cargo space is taken up by the reaction medium. Embodiments of such bags could have one or more mechanisms to get the slurry to the ship, including, for example, electric power disposed through the tow line to pump the slurry aboard, an internal bladder that expands via water (fresh or sea) being pumped in so as to squeeze out the slurry, and mechanical means to squeeze out or vacuum out the slurry. The slurry system in various embodiments may also be integrated into the ballast mechanism of the ship. In such embodiments, slurry gets loaded and then displaced with seawater as the slurry is consumed. Bladders and/or other mechanisms can maintain separation in such embodiments. It will be understood that any and all of the foregoing may be provided with monitoring, control and safety mechanisms. Additional embodiments use hoppers or another storage system built and configured to hold an amount of media.

Although the above discussion provides $CaCO_3$ as a possible reaction medium, it will be understood that any reaction medium capable of sequestering $CO_2$ may also be used. Exemplary materials include, for example, calcites, aragonites, sodium carbonate, sodium bicarbonate, magnesium silicate, etc. Certain embodiments incorporate a combination of carbonate and silicate media for the reaction. Various embodiments use a carbonate to silicate ratio of 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, or greater to optimize reaction conditions and/or kinetics. Certain embodiments are capable of altering a carbonate to silicate ratio to optimize reaction conditions and/or reaction kinetics.

Additionally, reaction media does not need to be pure, such that some media may contain additional components, so long as the reaction media is capable of reacting in a reactor to sequester carbon, sulfur, or other emissions. Where the reaction material is $CaCO_3$, it may be ground up limestone that is high purity or may be $CaCO_3$ obtained from dredging carbonate-rich sediments (including calcium carbonate-rich sediments). The composition of the $CaCO_3$, whether it is pure calcite or pure aragonite or something else, will impact the rate of dissolution and hence the rate of $CO_2$ and/or sulfur neutralization. For example, in various embodiments the dissolution rate of the reaction may be enhanced if aragonite is used instead of calcite. The reaction rate can also be modified by changing the grain size of the reactant material (e.g., carbonate, silicate, etc.). For example, grains approximately 500-700 μm diameter will dissolve 30 times more slowly than grains approximately 70-100 μm. Accordingly, in many embodiments, reaction rates may be enhanced using finer grained media (e.g., carbonate and/or silicate). Furthermore, grain size may be adjusted to control bubble size, which can increase interaction between gaseous and liquid phases.

In further embodiments, pressure, temperature, and/or other relevant reaction parameters are altered to control reaction kinetics. Certain embodiments adjust temperature by using engine heat through the use of circulating lines that are configured to capture heat generated from one or more engines. Additional embodiments are configured to utilize heat from exhaust gas to increase temperature for the reaction. Certain embodiments comprise systems for cooling a reactor or reactor vessel. In some such embodiments, reactor cooling is accomplished through circulating lines that run through a body of water. Other embodiments may control temperature through the use of secondary heating or cooling elements, such as heaters and chillers.

Certain embodiments are open systems allowing the reaction to proceed at ambient pressures at a particular locale. Additional embodiments are closed systems, which allow for pressure to build and/or be regulated within a reaction vessel. Reaction pressure may build with the introduction of water and gases into a reactor. In some embodiments, the reaction pressure is regulated using a valve, such as excess pressure vent 118, which can open to release or maintain pressure, while pressure increases through the introduction of exhaust gases.

Certain embodiments possess one or more sensors 124 to monitor a reaction parameter, such as temperature, pH, pressure, $pCO_2$, alkalinity, ion concentration, turbidity, optical depth, spectral data, flow rate, and/or any other relevant parameter. In many of these embodiments, sensors 124 are in communication (e.g., wired or wireless) with a monitor or controller 126 to provide readouts, alarms, and/or to record a status of the ongoing reaction(s). In further embodiments, monitor or controller 126 is configured to control reaction kinetics through the introduction of additional reaction media, increase or decrease water inflow or outflow, release or increase pressure, increase or decrease temperature, and/or any other relevant parameter for controlling reaction kinetics. An advantage of monitoring and controlling reaction parameters is to maintain reactor efficiency and maintain effluent water chemistry. For example, introduction of too much alkalinity in effluent can result in precipitation of carbonate, resulting in a release of $CO_2$, thus negating some or all of capture efficiency.

Within the reaction vessel of many embodiments, $CO_2$ equilibrates with seawater and dissolves in water; however, other gases (e.g., $N_2$ and/or Ar) and unreacted $CO_2$ may be directed to an excess pressure vent 118 (e.g., via a suitable vent stack). Similarly, outflow 110, with or without outflow pump 112, directs water from the reaction vessel to exit the vessel back to the ocean via a suitable pipeline. In many embodiments, this water may exit the ship through a diffusion pipe (tapered and perforated) located in any suitable location. Allowing effluent water to pass out of the discharge pipe in smaller quantities along the perforations enhances the mixing and dilution of the effluent with ambient seawater. In various embodiments, an outlet may be located near a ship propeller. In such embodiments, instantaneous dilution (50×) of the reaction vessel effluent is achieved. Water is subsequently further mixed with surface seawater by the action of the propeller blades and turbulence within a ship's wake.

FIG. 1B illustrates a two-stage reaction reactor 150 in accordance with many embodiments. In a two-stage reactor 150 of many embodiments, a first reaction vessel 152 is used to mix a gas coming entering via inlet 104 with water entering via inlet 106 to generate acidified water, where both inlets 104, 106 are in fluid communication with the first reaction vessel 152. Additionally, a second reaction vessel 154 allows for a reaction between acidified water produced in the first reaction vessel 152 and reaction medium 114. Neutralized effluent from second reaction vessel 154 is expelled through outlet 110 in fluid communication with the second reaction vessel 154. As noted elsewhere herein, inflow and outflow of water can be assisted with the use of one or more pumps 108, 112 that are in fluid communication with the water inlet 106 or outlet 110. In certain embodiments, first reaction vessel 152 is in fluid communication with second reaction vessel 154 via conduit 156 to allow acidified water from first reaction vessel 152 to travel to second reaction vessel 154. In many embodiments, flow through conduit 156 is supported with a pump 158 in fluid communication with conduit 156. However, certain embodiments use gravity assisted transport by placing first reaction vessel 152 above second reaction vessel 154. Excess pressure within either reaction chamber 152, 154 can be expelled through an excess pressure vent 118, and additional reaction media can be input to second reaction vessel 154 via a reaction medium inlet 120. One or more sensors 124 may be added to one or both reaction vessels 152, 154 to monitor reaction conditions. As noted elsewhere herein, sensors 124 can be in communication a monitor or controller 126 to monitor or control reaction conditions within reaction vessels 152, 154.

It will be understood that reaction vessels 102, 152, 154 may take any suitable size or volume. For example, an increased size of a ship or other marine vessel correlates to an increased power plant source, which produces more emissions. Larger reaction vessels 102, 152, 154 will compensate for increased $CO_2$ production from such increases in size. Additionally, increased speed of a ship or other marine vessel increases $CO_2$ emissions from increased propulsion, thus additional reaction vessel sizes would compensate for faster ocean transit.

In various embodiments, a reaction vessel may be a multiple of standard containers (or twenty foot equivalent units or TEUs). For example, in some embodiments a reaction vessel may be 10 m×10 m×10 m hence approximate volume of 1000 m³ (=35,000 ft³), which is equivalent to 27 TEUs or a stack of 20' containers in a 3×3×3 configuration. It will be understood that such reaction vessels would be configured to hold corrosive (pH 6) seawater that could weigh 48,000 lbs. In some embodiments, such a reaction vessel may be made from stainless steel, titanium, or any other suitable metal, for example. Although one specific volume of reaction vessel is described, such vessel may be provided in a variety of volumes such that $CO_2$ neutralization at various rates and volumes may be implemented according to desired operating conditions.

It should be understood that reactors 100, 150 can be included on any number of vessels or uses, including cargo ships, ferries, tankers, cruise liners, ocean liners, and other marine vessels. It will also be understood that reactors 100, 150 as described herein are applicable for capture or sequestration of many types of emissions and is not limited to ships or other marine vessels. Certain embodiments are configured to be static and capture atmospheric carbon, sulfur, or other emission, such that a reactor is coupled with a direct air capture system. Further, when implemented on marine vessels, various embodiments are configured as a standalone system that can be installed during a retrofit of an existing marine vessel, while additional embodiments are integrally constructed during construction of newly built vessels.

Figure 2:
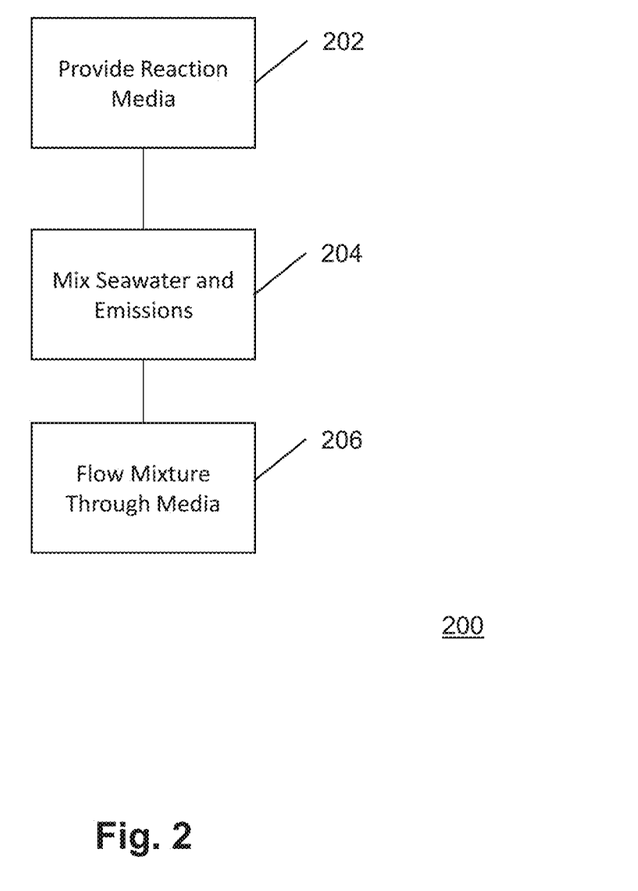
FIG. 2 provides a method of sequestering emissions, in accordance with embodiments.

Turning to FIG. 2, additional embodiments are directed to methods of sequestering carbon using a carbon sequestration reactor, such as described herein. In particular, FIG. 2 illustrates method 200 for sequestering carbon using reactor embodiments. At 202, many embodiments provide a reaction medium in a reaction vessel, such as described elsewhere herein, disposed within a reaction vessel. At 204, various embodiments mix seawater and emissions from a source within a reaction vessel. As noted elsewhere herein, one or more reaction vessels may be used, depending on the use of a one- or two-stage reactor. As such, some embodiments may provide a reaction media 202 and mix seawater and emissions 204 in a single reaction vessel or may provide a reaction media 202 to a first reaction vessel, while mixing seawater and emissions 204 in a second reaction vessel. At 206, many embodiments flow the mixture of seawater and emissions through the reaction media such that carbon is sequestered from the mixture. It should be noted that various embodiments will perform features of method 200 simultaneously and/or in a different order than described and illustrated in FIG. 2.

Certain embodiments include more than one reactor 100, 150 within a larger system for sequestering carbon, sulfur, or other emission. In such embodiments, multiple reactors 100, 150 are placed in series or in parallel. For example, in series, effluent from one reactor may be fed into a second reactor to allow for additional reaction and neutralization of acidity in the water. When using a two-stage reactor 150, some systems use only second reaction chamber 154 to allow for continued neutralization of the water via reaction media 114. In embodiments using a parallel system, one gas inlet 104 may be fed to multiple reactors 110, 150 to increase the amount of carbon, sulfur, or other emission that is dissolved into and acidifies the water.

EXEMPLARY EMBODIMENTS

Although specific embodiments of reaction systems, reaction system functionalities and reaction system applications are discussed in the following sections it will be understood that these embodiments are provided as exemplary and are not intended to be limiting.

Exemplary Set-Up

In one exemplary prophetic example, a supply of 1.25× $10^9$ g $CaCO_3$ per day will titrate the $CO_2$ produced by one ship burning 175 tons of diesel fuel per day (10,000 TEU ship traveling at 21 knots). This mass (and hence volume) of granular $CaCO_3$ can be carried in the volume equivalent of 24.3 three standard 20' shipping containers (TEUs), assuming 50% porosity. A shipping container (one TEU) is 8'×8.5'×20'. This is 38.14 m$^3$. Accordingly, it would be necessary to use ~24 shipping containers/day of $CaCO_3$ (at 50% porosity) to neutralize a >10,000 TEU ship going 20 knots. This is based on 175 tons fuel/day and a conversion factor of 0.855 to C. This is ~15×10$^7$ grams $CaCO_3$ (514,890 moles C) fit in one TEU.

In the following example simulations the following assumptions are made:
 5% $CO_2$ in the flue gas,
 a reactor that is 10×10×10 meters3 in volume,
 a seawater flow rate of 250 Liters/sec through a volume that is 50% rock and 50% prebubbled $CO_2$/seawater,
 starting alkalinity (Alk) of 2200 µmol/L, a starting dissolved inorganic carbon (DIC) of 2000 µmol/L and a starting [Ca] of 10.3 mmol/L
 a limestone reaction medium ground to 100 µm diameter,
 a 21° C. dissolution rate data (uncatalyzed) as determined from experiment, In these embodiments, the calculation happens in 3 steps:
1. Bubble flue gas into seawater and assume complete equilibration.
2. Calculate the time progression of dissolution reaction in the reactor.
3. Take the steady-state reactor output and mix it with various amounts of ambient seawater.

Based on these parameters and an average transit time across the Atlantic (9 days) and Pacific (16 days) would require ships to carry 219 to 389 volume equivalent of shipping containers (TEUs) full of $CaCO_3$. However, the mass of a TEU filled with $CaCO_3$ may exceed the weight specifications of a TEU, thus a TEU may not be filled entirely with reaction media. As such, additional TEUs may be necessary to hold all of the reaction media and/or hoppers installed to hold reaction media.

As will be discussed in greater detail below, according to rates determined via kinetic analysis, to achieve this degree of $CO_2$ neutralization, seawater must be pumped out of the surface ocean, into the gas equilibration chamber and through the reaction chamber (containing the $CaCO_3$) at a rate of 36,000-72,000 L/sec (571,000 to 1,141,000 gallons per minute). Given a ship speed of 20 knots (~10 m/sec), this largest flux of water requires a hull opening of 7.25 m$^2$ (about 9'×9') to get the needed 72,000 L/sec.

Example 1: Study of Time Progression of Reactor to Steady-State

Figure 3:
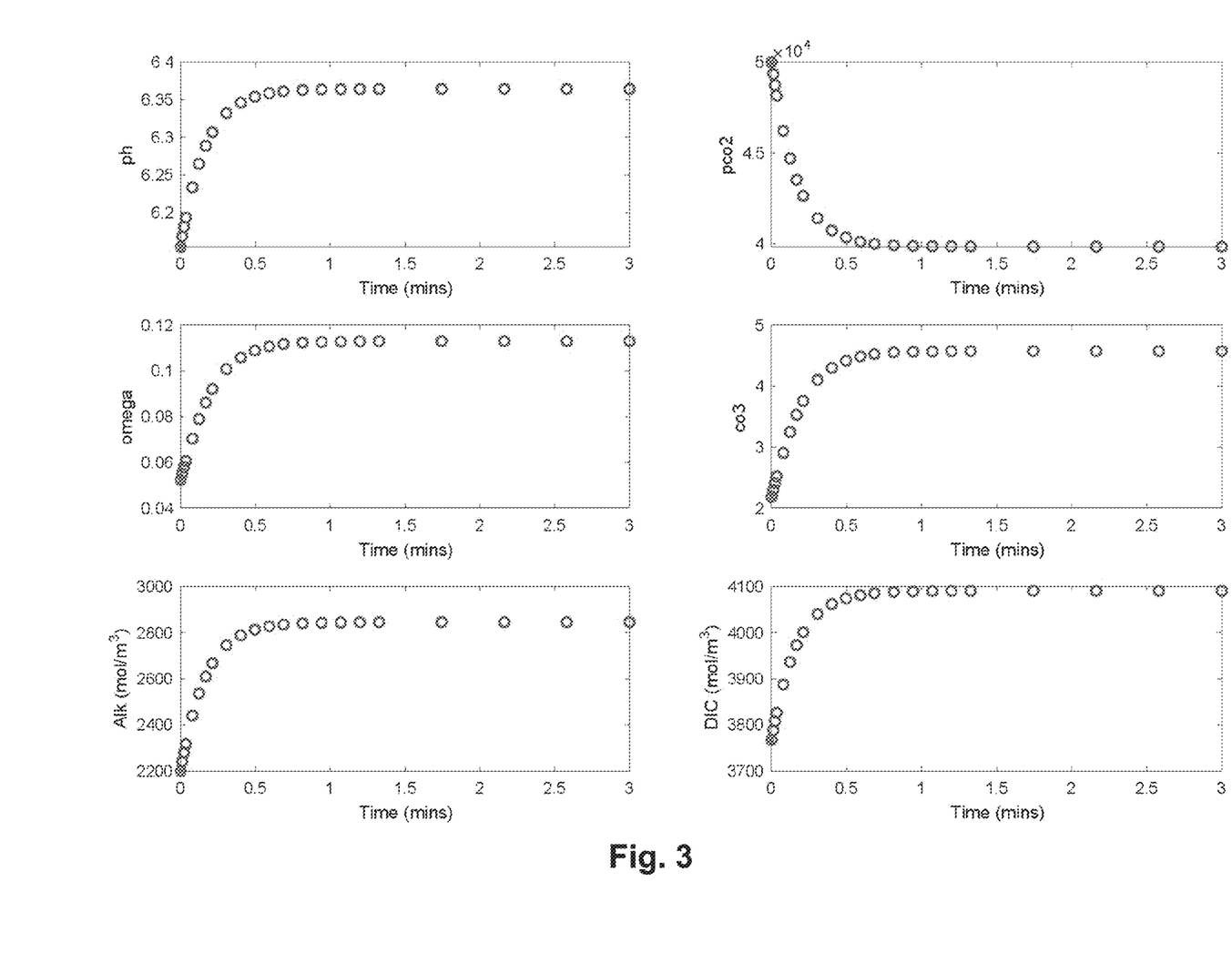
FIG. 3 provides data on a reactor system's approach to steady state calculation, in accordance with embodiments.

Methods: In a first study, the time progression of a reactor, according to embodiments, towards a steady-state for a variety of parameters, including pH, $pCO_2$, $[CO_3]$, alkalinity (Alk), dissolved inorganic carbon (DIC), and saturation (omega, which is a measure of the thermodynamic potential for the mineral to form or dissolve according to: $\Omega=[Ca^{2+}][CO_3^{2-}]/K_{sp}$) is provided.

Results: This data is summarized in FIG. 3. In this study, the ambient seawater has a DIC of 2000 µmol/L and Alk of 2200 µeq/L. The reactor input (post mixing between seawater and flue gas) has a DIC of 3768 µmol/L, Alk of 2200 µeq/L, and $pCO_2$ of 5000 ppm. The output after reaction is calculated to be: DIC of 4880 µmol/L, Alk of 4425 µeq/L and a $pCO_2$ of 1562 ppm. This shows that the reaction does dissolve a substantial fraction of the carbon introduced to the reactor. Specifically, this reaction dissolves 1.05×10$^5$ moles C/day, which equates to a TEU of carbonate every 4 days. As discussed this would not be sufficient to capture all the $CO_2$ emission based on the estimates. However, also as shown, the omega, or saturation level within the reactor is only 0.73 (where 1 represents saturation).

Conclusion: This implies that the reactor conditions (e.g., volume, flow, etc.) may be further engineered to increase the rate of the reaction. Further discussion of how the rate of reaction within reactors (according to embodiments) will be provided in the following section.

Example 2: Study of Mixing on $pCO_2$ Output

Methods: As discussed above, the $pCO_2$ output at steady-state in a reactor is ~1562 ppm. This output of $pCO_2$ is high and could lead to outgassing from the effluent of the reactor, which would diminish the net carbon sequestration. According to some embodiments, the effluent may be mixed with seawater at the output to reduce this $pCO_2$.

Figure 4:
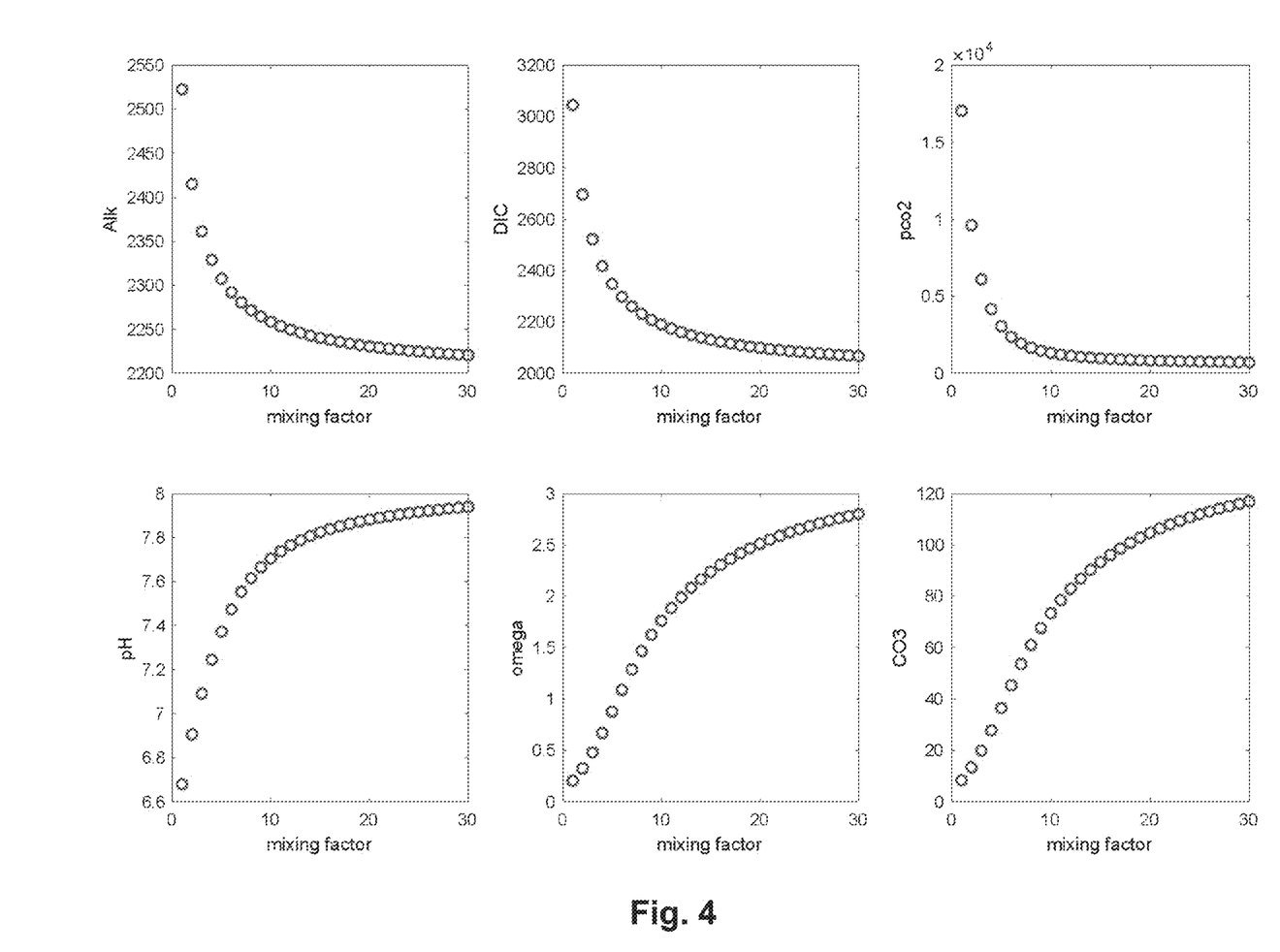
FIG. 4 provides data on the effect of seawater mixing on a reactor system, in accordance with embodiments.

Results: As shown in the data plots of FIG. 4, mixing the effluent output with seawater dramatically reduces the $pCO_2$ of the output. Specifically, at a 5× mixing ration the $pCO_2$ drops to ~1350 ppm, at 10× to ~889 ppm, and at 30× to ~641 ppm.

Example 3: Effect of Reactor Volume and Flow Rate Reactor Efficiency

Methods: In a third study, as summarized in FIGS. 5-7, the effect of reactor volume and flow rate on a number of reactor parameters is studied.

Figure 5:
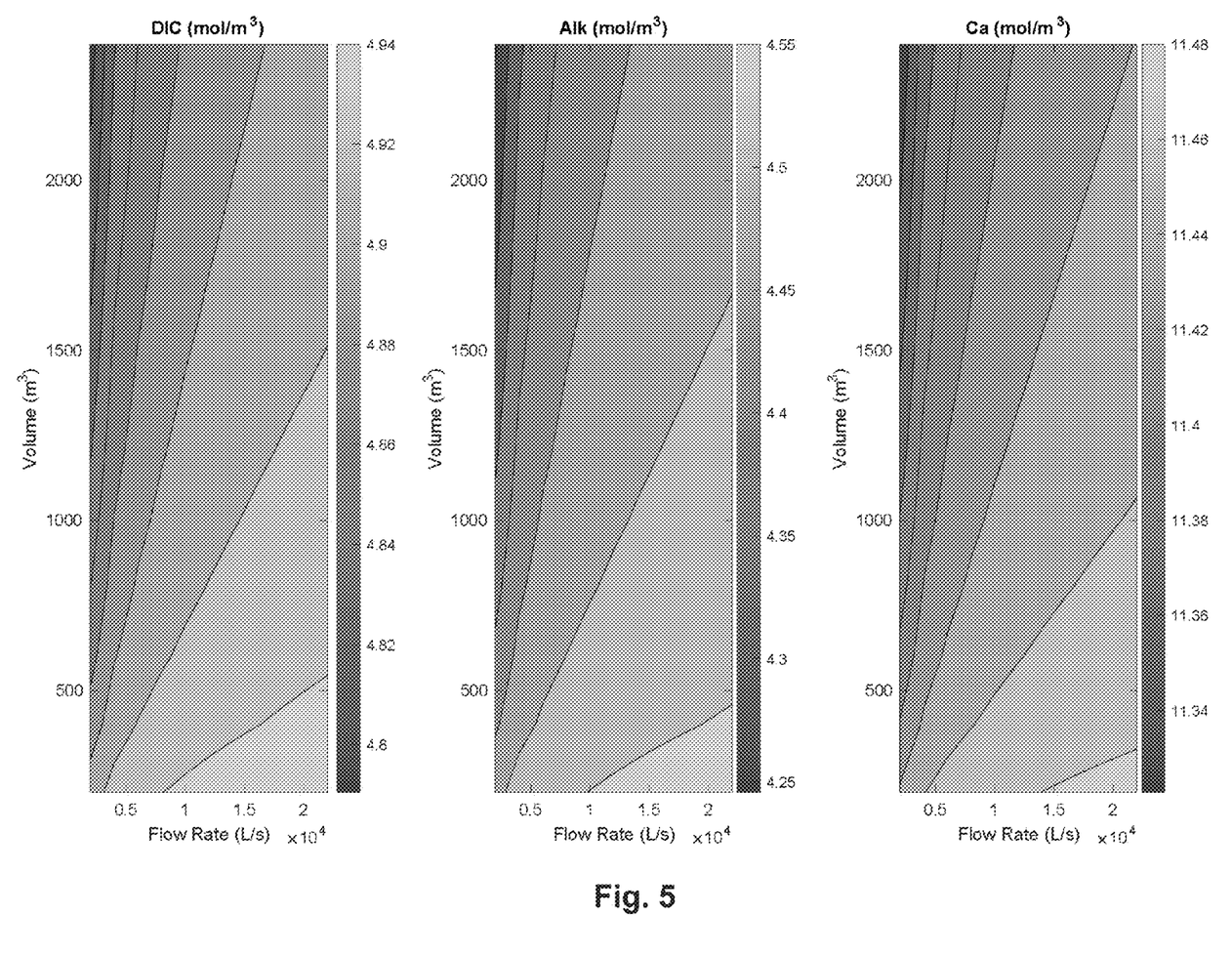
FIG. 5 provides data on the effect of volume and flow rate on a reactor system, in accordance with embodiments.
Figure 6:
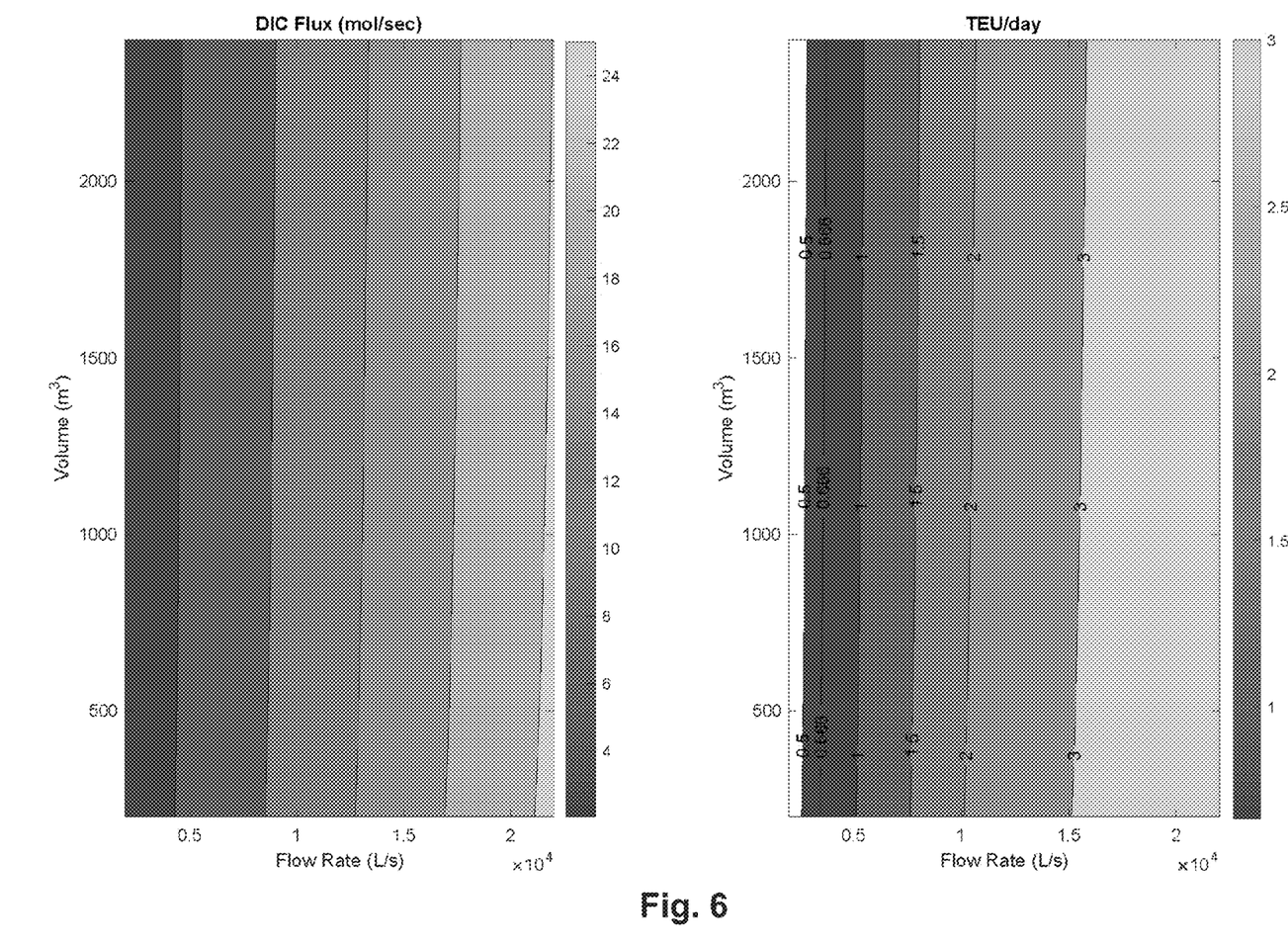
FIG. 6 provides data on the effect of volume and flow rate on DIC flux from a reactor system, in accordance with embodiments.

Results: Specifically, as shown in FIG. 5, lower flow rates and larger volumes allow the reaction to go more to completion, e.g., increasing DIC, alkalinity, etc. in the outflow of the reactor. However, the more important parameter is DIC flux (e.g., the product of [DIC] and flow rate) through the system. Data from studies of this DIC flux is provided in FIG. 6. As shown, the DIC flux is independent of reactor volume, but the flow rate changes are large compared the DIC changes.

Figure 7:
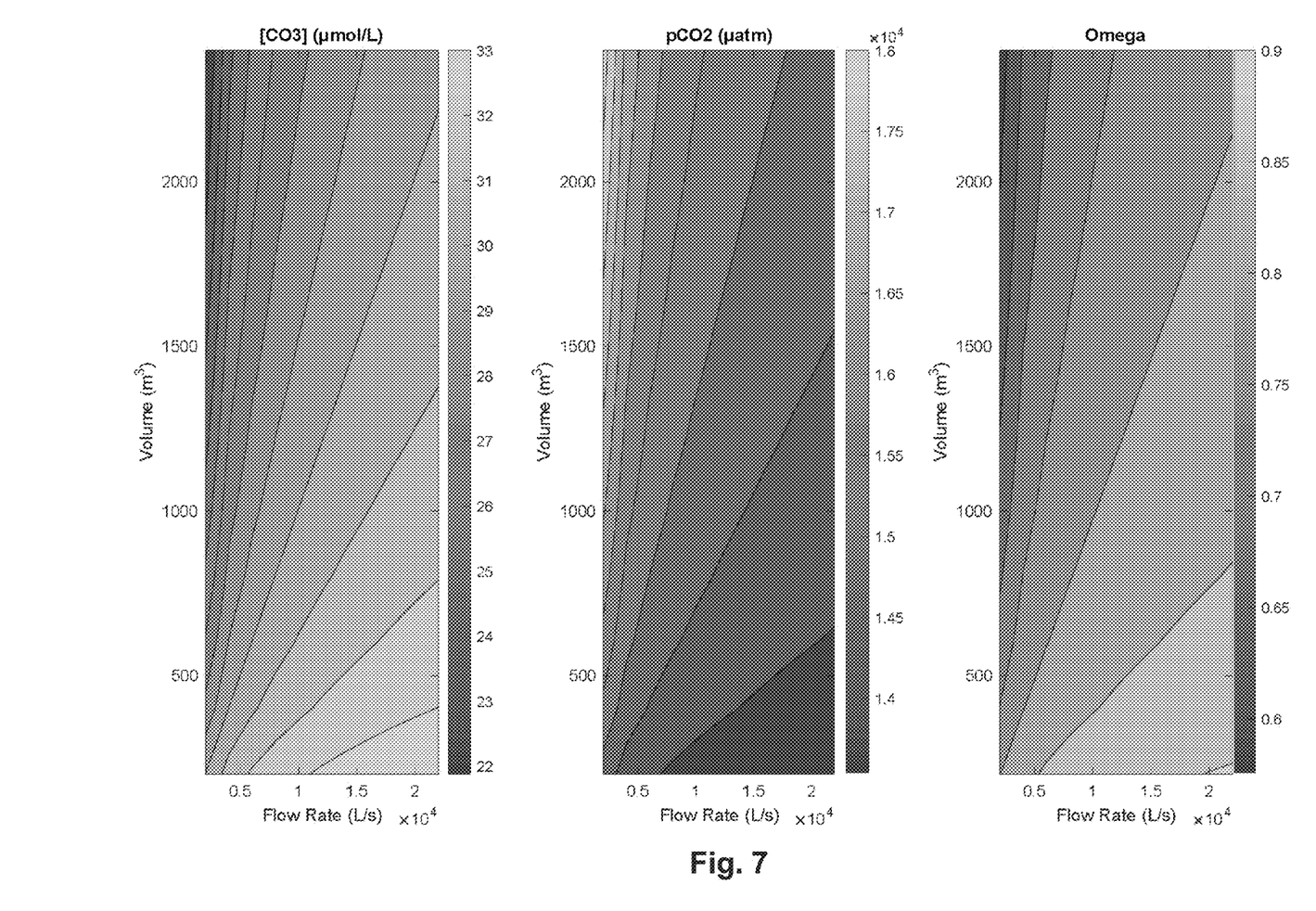
FIG. 7 provides data on the effect of volume and flow rate on $pCO_2$ output from a reactor system, in accordance with embodiments.

Conclusion: According to these studies, a flow rate of ~2000 L/s would provide a residence time of 0.66 TEU/day, which would mean with four to five such systems it would be possible to arrive at the target sequestration rate of 3 TEU/day. The output of $pCO_2$, as shown in FIG. 7, is affected by both flow and volume. Larger reactor volumes lead to smaller $pCO_2$ values at a given flow rate. This effect is further discussed in the section below.

Example 4: Effect of Volume Post-Mixing

Figure 8:
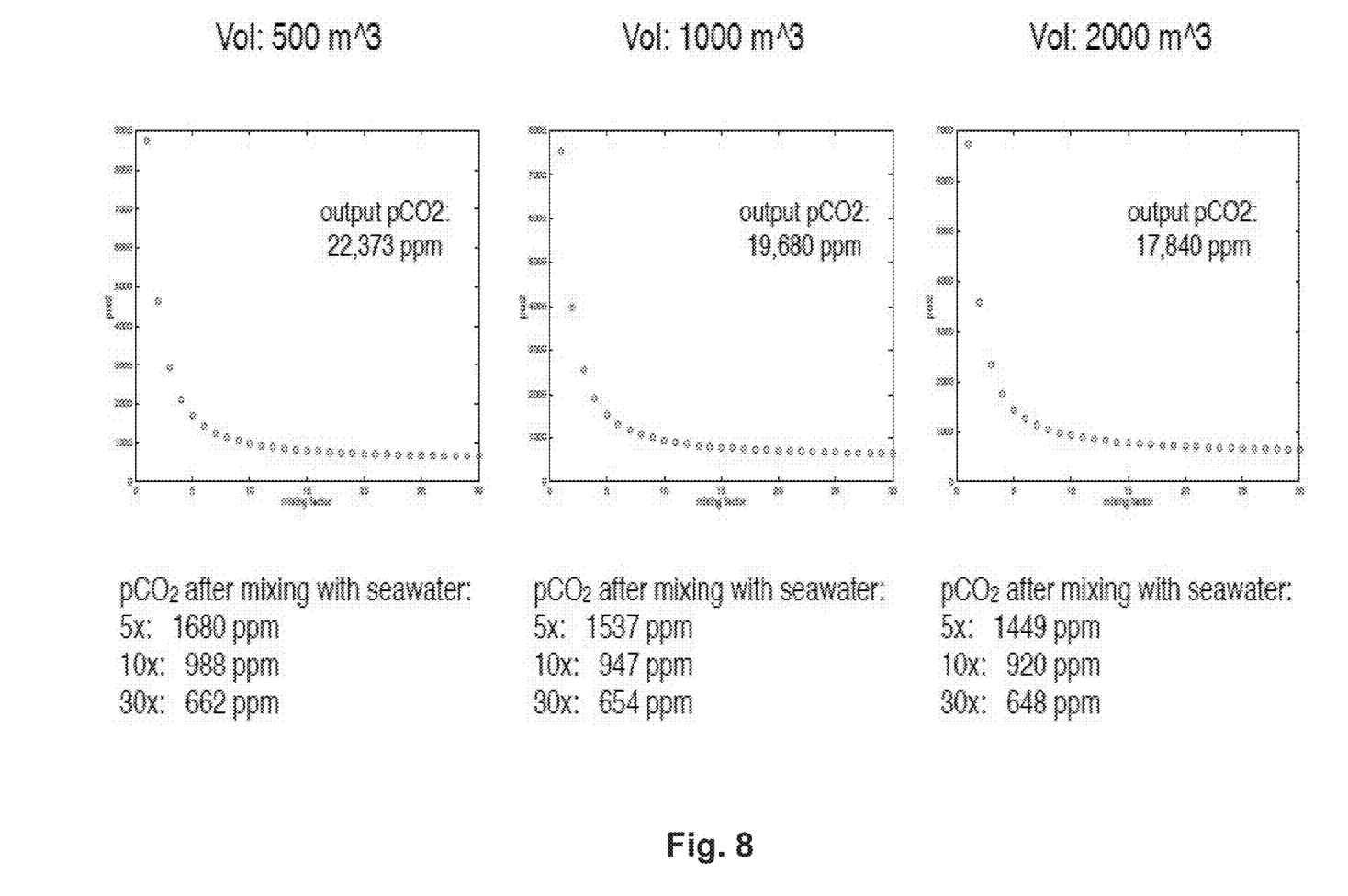
FIG. 8 provides data on the effect of mixing ratios on a reactor system, in accordance with embodiments.

Methods: As previously discussed, it has been shown that by engineering flow rate and post-reaction mixing it is possible to improve the efficiency of embodiments of reactors in capturing carbon. As shown in FIG. 8, while reactor volume does have an effect on the pCO2 after mixing with seawater.

Conclusion: Accordingly, the volume of the reactor may be engineered (as allowed by the footprint of the vessel) to further increase the efficiency of embodiments of reactors.

DOCTRINE OF EQUIVALENTS

While several alternative configurations for systems have been depicted, it should be clear that any of a variety of system configurations can be implemented in accordance with many embodiments of the invention.

More generally, as can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An emissions sequestration reactor for a marine vessel comprising:
   a reaction vessel having at least a gas inlet in fluid communication with an emission output stream from a marine vessel, a seawater inlet in fluid communication with a source of seawater, and a fluid outlet, the reaction vessel further having at least a mixing region adjacent the seawater and gas inlets, and a reaction region disposed between the mixing region and the outlet;
   a reaction medium disposed within the reaction region and configured to sequester at least one of carbon and sulfur from the emission output; and
   a diffusion grating onto which the reaction medium is disposed, positioned between the mixing region and reaction region and configured to allow fluid to pass between the mixing region and the reaction region and prevent the reaction medium from passing into the mixing region while allowing seawater to pass into the reaction region from the mixing region.

2. The emissions sequestration reactor of claim 1, wherein the seawater inlet is connected to a structural access point on the hull of the marine vessel.

3. The emissions sequestration reactor of claim 1, wherein the fluid outlet directs water to a location near a propeller of the marine vessel.

4. The emissions sequestration reactor of claim 1, further comprising at least one of:
   an inflow pump in fluid communication with the seawater inlet for pumping seawater into the reaction vessel at a desired flow rate; and
   an outflow pump in fluid communication with the seawater outlet for pumping seawater out of the reaction vessel at a desired flow rate.

5. The emissions sequestration reactor of claim 1, further comprising a sensor to monitor a reaction parameter within the emissions sequestration reactor, wherein the sensor measures a parameter selected from the group consisting of temperature, pH, pressure, $pCO_2$, alkalinity, ion concentration, turbidity, optical depth, spectral data, and flow rate.

6. The emissions sequestration reactor of claim 5, wherein the sensor is in communication with a controller that is configured to control reaction kinetics.

7. The emissions sequestration reactor of claim 6, wherein the controller controls reaction kinetics via at least one of the group consisting of: introducing additional reaction media, increasing water inflow, increasing water outflow, decreasing water inflow, decreasing water outflow, release pressure, increase pressure, increase temperature, and decrease temperature.

8. The emissions sequestration reactor of claim 1, further comprising a gravity feed system or conveyor system to provide the reaction medium to the reactor vessel via a reaction medium inlet connected to the reaction vessel.

9. The emissions sequestration reactor of claim 1, wherein the reactor vessel is a closed system and comprises an excess pressure vent to maintain reaction vessel pressure.

10. The emissions sequestration reactor of claim 1, wherein the reaction medium is selected from at least one of the group consisting of carbonate and silicate.

11. The emissions sequestration reactor of claim 1, further comprising a system to control the flow of exhaust gas into the reaction vessel.

12. The emissions sequestration reactor of claim 1, further comprising a system to utilize waste heat to control temperature of the reactor vessel.

13. The emissions sequestration reactor of claim 1, wherein a reaction rate within the reactor vessel is enhanced based on grain size of the reaction medium.

14. The emissions sequestration reactor of claim 1, wherein grain size of the reaction medium is adjusted to increase interaction between gaseous and liquid phases.

15. The emissions sequestration reactor of claim 1, further comprising a system to increase contact between a gaseous phase and a liquid phase.

16. An emissions sequestration reactor for a marine vessel comprising:
   a first reaction vessel having at least a gas inlet in fluid communication with an emission output stream from a marine vessel, a seawater inlet in fluid communication with a source of seawater,
   a second reaction vessel having at least a fluid outlet; and
   a reaction medium disposed within the second reaction vessel and configured to sequester at least one of carbon and sulfur from the emission output;

wherein the first reaction vessel and second reaction vessel are in fluid communication via a conduit.

17. The emissions sequestration reactor of claim 16, wherein:
the seawater inlet is connected to a structural access point on the hull of the marine vessel; or
the fluid outlet is located near a propeller of the marine vessel.

18. The emissions sequestration reactor of claim 16, further comprising at least one of:
an inflow pump in fluid communication with the seawater inlet for pumping seawater into the reaction vessel at a desired flow rate; and
an outflow pump in fluid communication with the seawater outlet for pumping seawater out of the reaction vessel at a desired flow rate.

19. The emissions sequestration reactor of claim 16, wherein the reaction medium is selected from at least one of the group consisting of carbonate and silicate.

20. A method of sequestering carbon from a marine vessel comprising:
providing a reaction medium disposed within a reaction region of a reaction vessel, the reaction medium being configured to sequester a pollutant from an emissions source, wherein the pollutant comprises at least one of carbon and sulfur;
mixing seawater with emissions from a marine vessel together; and
flowing the mixture of seawater and emissions through the reaction medium such the pollutant is sequestered from the mixture.

\* \* \* \* \*